(12) United States Patent
Ghiran et al.

(10) Patent No.: US 7,441,433 B2
(45) Date of Patent: Oct. 28, 2008

(54) TOOL FOR FORMING THREADED HOLE IN A HYDROFORMED PART

(75) Inventors: Mike M. Ghiran, Lake Orion, MI (US); Spyros P. Mellas, Waterford, MI (US); David H. Shea, Lake Orion, MI (US); Paul D. Larsen, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/622,013

(22) Filed: Jan. 11, 2007

(65) Prior Publication Data

US 2008/0168817 A1 Jul. 17, 2008

(51) Int. Cl.
*B21C 37/29* (2006.01)
(52) U.S. Cl. .................... 72/71; 72/55; 72/325
(58) Field of Classification Search .......... 72/55, 72/71, 325, 326, 327, 329
See application file for complete search history.

(56) References Cited

U.S. PATENT DOCUMENTS

| | | | | |
|---|---|---|---|---|
| 3,295,398 A | * | 1/1967 | Morain | 408/110 |
| 3,302,493 A | * | 2/1967 | Hulslander et al. | 72/71 |
| 3,411,527 A | * | 11/1968 | Nielsen, Jr. | 137/318 |
| 3,812,698 A | * | 5/1974 | Stock | 72/71 |
| 6,109,086 A | * | 8/2000 | Gambrel et al. | 72/326 |
| 6,658,908 B1 | * | 12/2003 | Ghiran et al. | 72/55 |
| 6,931,901 B2 | | 8/2005 | Ghiran et al. | |
| 7,003,995 B2 | | 2/2006 | Ghiran et al. | |
| 2007/0101787 A1 | * | 5/2007 | Fujiuchi et al. | 72/71 |

* cited by examiner

*Primary Examiner*—Edward Tolan

(57) ABSTRACT

A tool forms a threaded hole in a hydroformed part while the part remains in a hydroforming die cavity and under pressure. The tool has a hole-piercing end portion adapted on advancement of the tool to pierce and form a hole in the part and an extruding portion adapted on continued tool advancement to extrude an annular extrusion that extends into the tube interior. An adjacent sealing portion of the tool seals the hole during the ongoing advancement and extrusion of the annular extrusion so that hydroforming fluid remains under pressure. A thread-forming portion of the tool forms an internal thread within the annular extrusion upon the continued advancement and rotation of the tool.

8 Claims, 5 Drawing Sheets

TOOL FOR FORMING THREADED HOLE IN A HYDROFORMED PART

FIELD OF THE INVENTION

The present invention relates to a tool for forming a threaded hole in a hydroformed part while the part is in the hydroforming die.

BACKGROUND OF THE INVENTION

It is known in the manufacture of motor vehicles to form tubular structures such as roof rails and frame rails and other parts by capturing a tube with a die cavity, sealing the ends of the tube, and introducing pressurized fluid to expand the tube into a shape defined by the die cavity. In the interest of economies of manufacture, it is desirable to perform additional operations on the hydroformed part such as the punching of holes and the threading of holes while the part is still captured within the die and subject to internal pressure by the pressurized fluid.

It would be desirable to provide a new and improved tool for forming an annular extruded hole within the tube and providing an internal thread within the walls of the annular extruded hole.

SUMMARY OF THE INVENTION

A tool forms a threaded hole in a hydroformed part while the part remains in a hydroforming die cavity and under pressure. The tool has a hole piercing end portion adapted on advancement of the tool to pierce and form a hole in the part. The tool also has an extruding portion adapted on continued tool advancement to extrude an annular region of the part extending about the hole and form an annular extrusion that extends into the tube interior. An adjacent sealing portion of the tool seals the hole during the ongoing advancement and extrusion of the annular extrusion so that hydroforming fluid remains under pressure. A thread-forming portion of the tool forms an internal thread within the annular extrusion upon the continued advancement and rotation of the tool.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
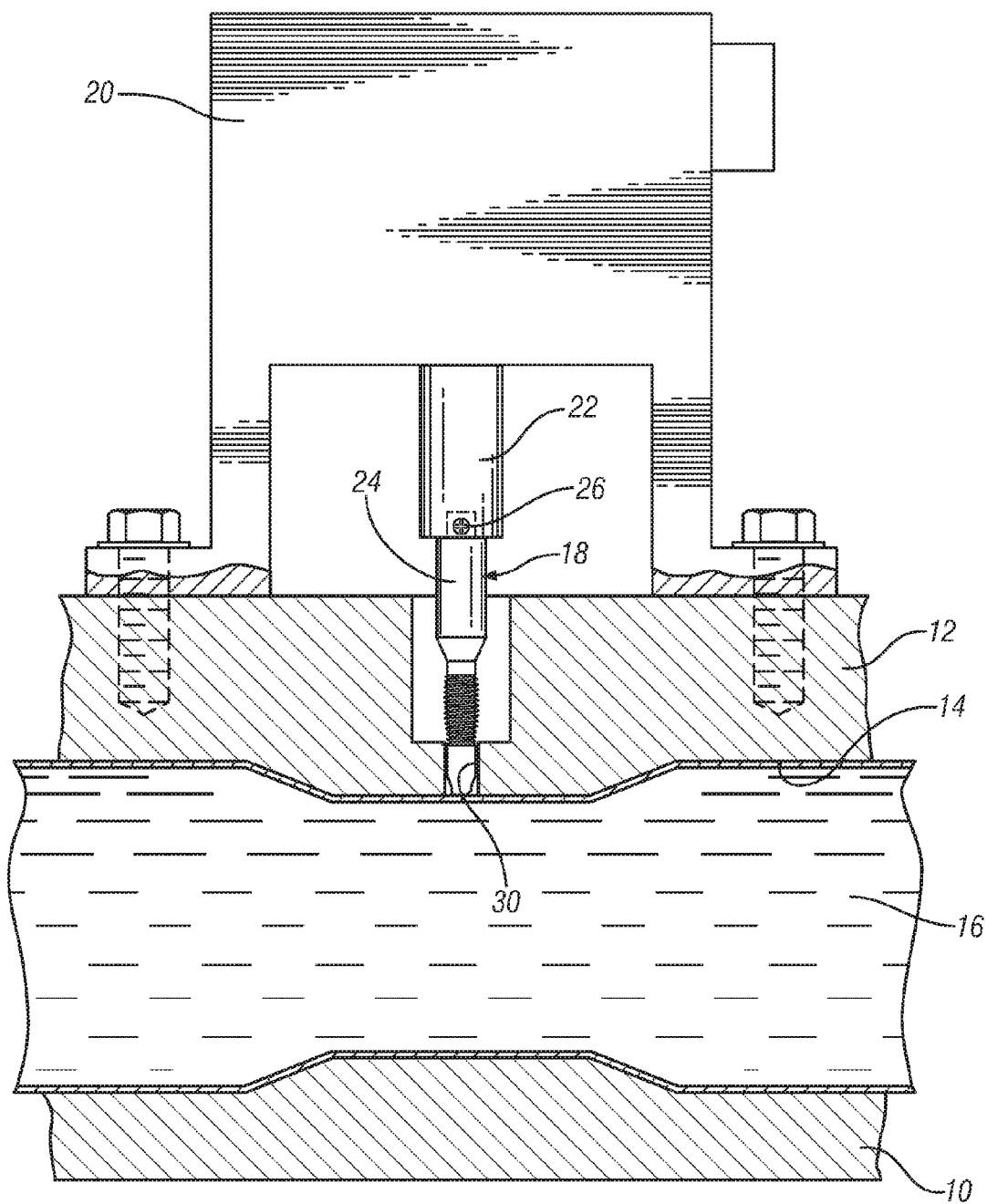
FIG. 1 is an elevation view of a hydroforming die with a tool and tool actuator device, having parts broken away and in section.

Referring to FIG. 1, a portion of a conventional hydroforming apparatus is shown and includes a lower die 10 and an upper die 12 that form a die cavity 14 having a shape conforming to the required shape of the final part. A tube 16 is captured in the die cavity 14, the ends of the tube are sealed, and the tube is filled with a fluid. The fluid is pressurized to forcibly expand the tube 16 outwardly into conformance with the shape of the die cavity 14 to thereby form the hydroformed part.

Apparatus is provided for forming a threaded hole and includes a hydrotapping tool 18 that is driven by an actuator device 20. The actuator device 20 is an electric motor powered drive unit or an electro-hydraulic powered drive unit, or other type of suitable drive unit, such as the hydrotapping power unit shown in U.S. Pat. No. 7,003,995, assigned to the assignee of this invention. The actuator device 20 has a drive shaft 22 with a socket at the end for receiving the shank end 24 of the hydrotapping tool 18. A set screw 26 retains the shank end 24 within the socket of the drive shaft 22. The actuator device 20 and its drive shaft 22 suspend the hydrotapping tool 18 within a bore 30 formed in the upper die 12. The actuator device 20 will be actuated to move the hydrotapping tool 18 through a series of advances and rotations, and withdrawals and reverse rotations, as will be described hereinafter.

Figure 2:
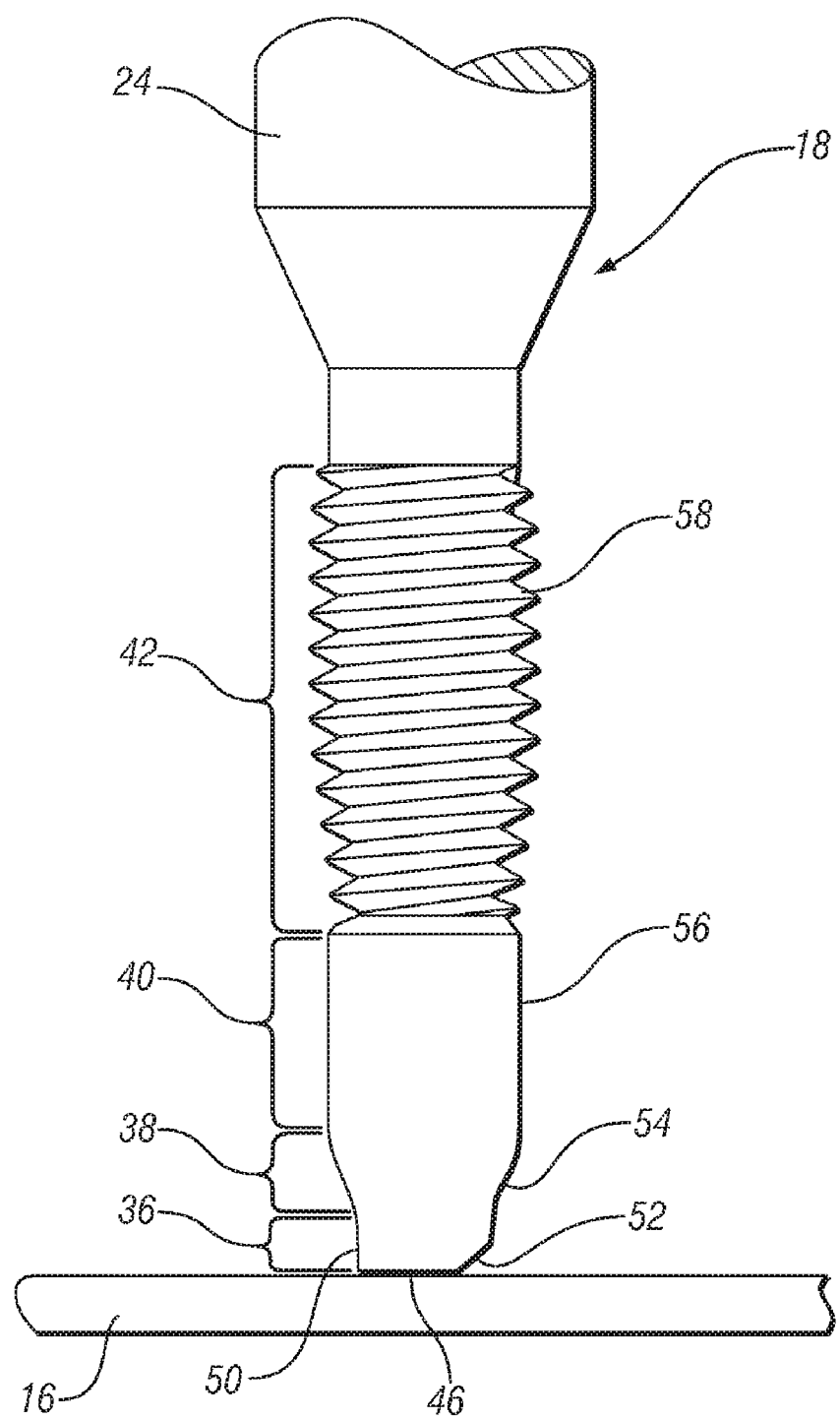
FIG. 2 is an enlarged side elevation view of the tool of FIG. 1.

Referring to FIG. 2, it is seen that the hydrotapping tool 18 includes a hole-piercing end portion 36, an adjacent extrusion forming portion 38, a hole-sealing portion 40, and a thread-forming portion 42.

The hole-piercing end portion 36 includes a blunt end 46 of circular shape that is at right angles to the axis of the tool 18 and is adjacent to an adjoining cylindrical surface 50. The diameter of the blunt end 46 is substantially less than the diameter of the threaded hole that is to be formed. The blunt end 46 has a flat chamfer 52 on one side thereof that is at an acute angle so as to intersect the blunt end 46 and the cylindrical surface 50.

The extrusion-forming portion 38 includes a concave-convex annular surface 54 that transitions the diameter of the tool 18 from the diameter of the cylindrical surface 50 to the larger diameter of a cylindrical surface 56 that forms the hole-sealing portion 40.

The thread-forming portion 42 includes a tapping thread 58 that will be discussed more fully hereinafter.

As seen in FIGS. 1 and 2, the drive shaft 22 of the actuator device 20 positions the tool 18 with the blunt end 46 contacting and supporting the outside of the tube 16 so that the tube 16 will not be formed into the bore 30 by the hydroforming pressure within the tube 16.

Figure 3:
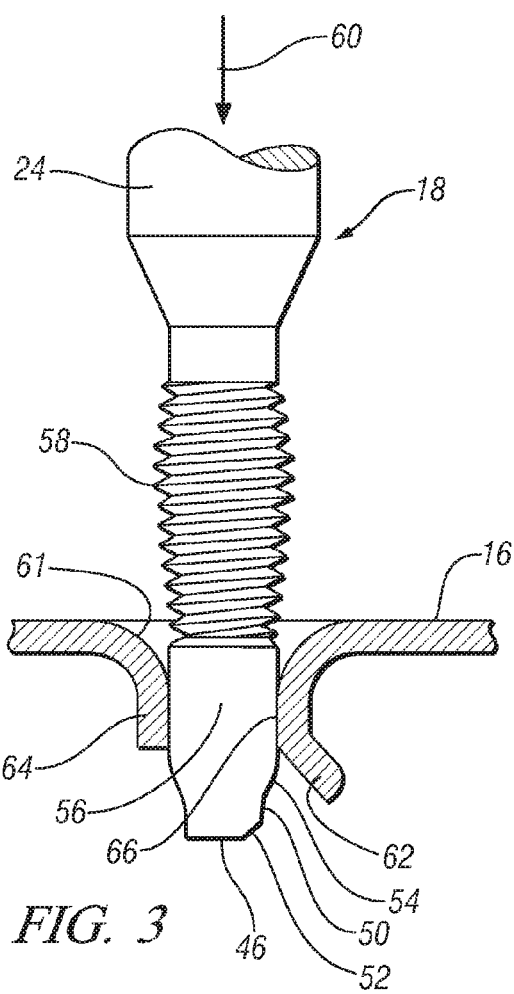
FIG. 3 is side elevation view showing the tool piercing the tube wall and extruding an annular extrusion.

In FIG. 3 the tool 18 has been advanced in the direction of arrow 60. The blunt end 46 and the flat chamfer 52 have cooperated to form a hole 61 by piercing through the wall of the tube 16 and displacing slug 62 of material that remains affixed to the tube 16. The advance of the tool 18 has caused the concave-convex annular surface 54 of the extrusion forming portion 38 to have formed an annular extrusion 64 that extends into the interior of the tube 16 and has a cylindrical inner surface 66. The cylindrical surface 56 of the seal-forming portion 40 sizes the inner surface 66 to prepare for receiving the tapping thread 58 of the thread-forming portion 42. The tight fit between the cylindrical surface 56 of the seal-forming portion 40 of the tool 18 and the inner surface 66 of annular extrusion 64 maintains a fluid seal to minimize the loss of pressure and fluid through the hole 61.

Figure 4:
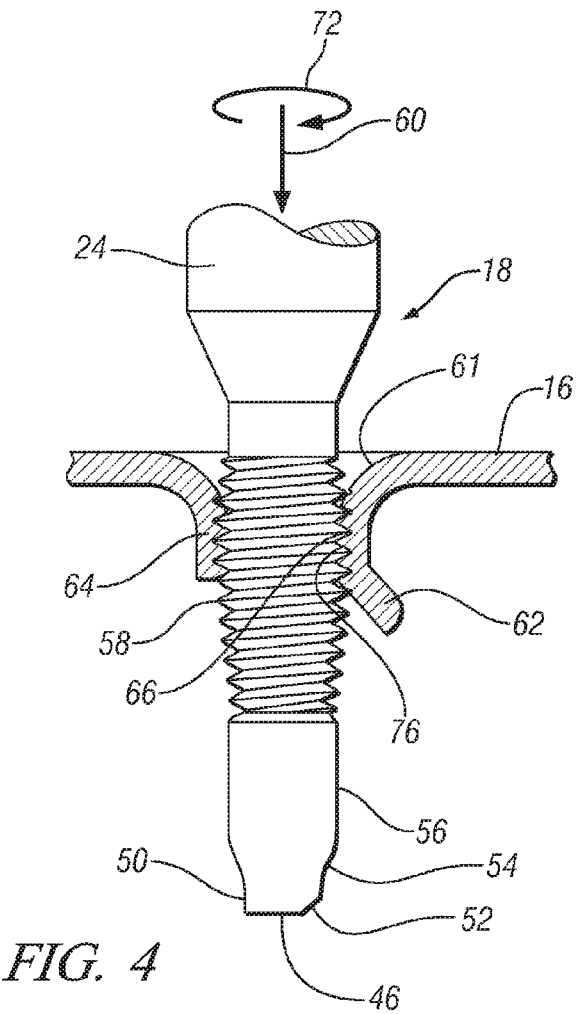
FIG. 4 is a side elevation view showing the tool threading the annular extrusion.

In FIG. 4, the tool 18 has been simultaneously advanced in the direction of arrow 60 and rotated in the direction of arrow 72 so that the tapping thread 58 of the thread-forming portion 42 has entered the annular extrusion 64 to form a thread 76 within the inner surface 66 of the annular extrusion 64. The tool 18 forms the thread 76 via a forming and displacement of material rather than via a thread-cutting action that would create debris that would enter the hydroforming fluid. Of course, the axial feed rate and rotation speed of the tool 18 are controlled to precisely match the thread pitch of the tapping threads 58 on the thread-forming portion 42.

Figure 5:
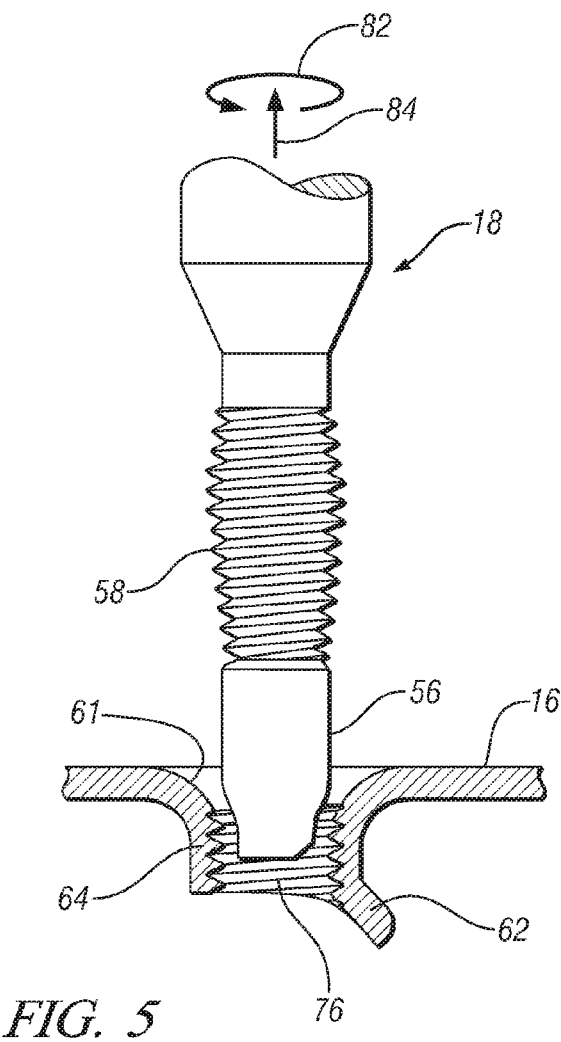
FIG. 5 is a side elevation view showing the tool being withdrawn from the threaded annular extrusion.
Figure 6:
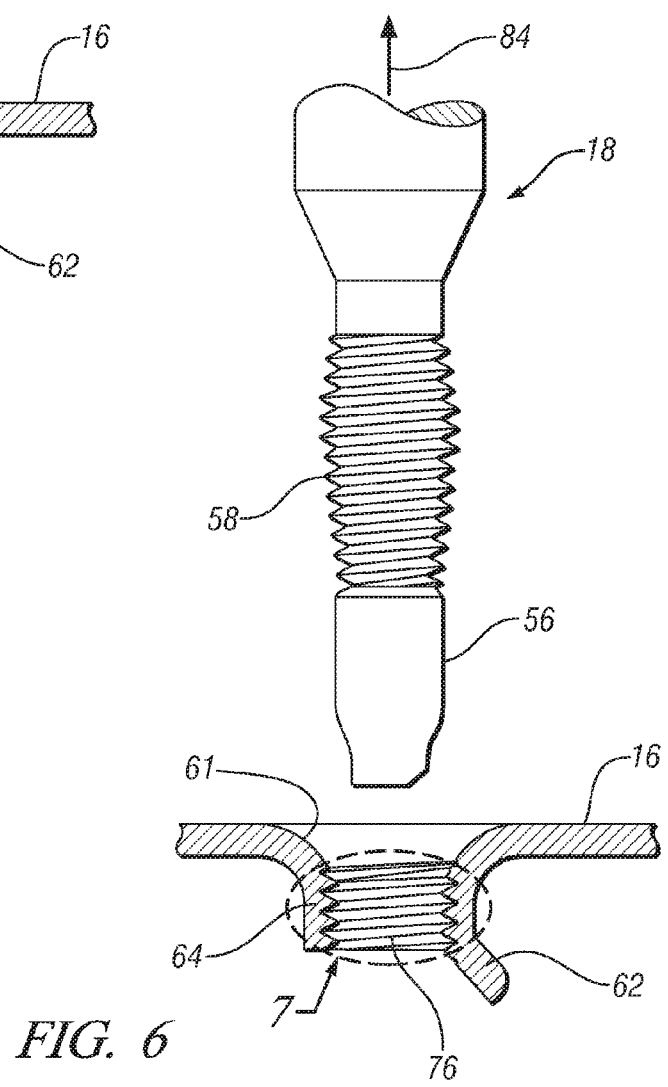
FIG. 6 is a side elevation view showing the tool fully withdrawn from the finished threaded hole.

FIG. 5 shows that the tool 18 is being withdrawn from the tube 16 by rotating the tool 18 in the reverse direction of arrow 82 while simultaneously withdrawing the tool in the axial direction of arrow 84. In FIG. 6 the tool is fully withdrawn in the direction of arrow 84. Prior to the withdrawal of the tool 18, the pressure has been relieved from the tube 16.

Figure 7:
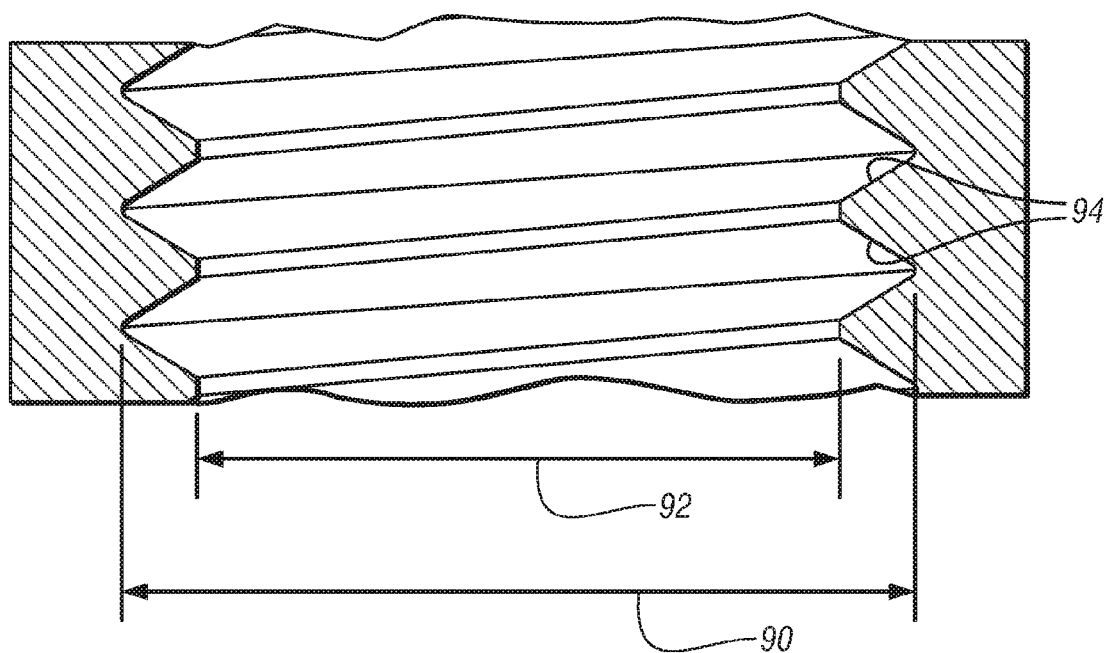
FIG. 7 is an enlarged fragmentary section view showing the thread formed by the tool.

Referring now to FIG. 7, a consideration in the design of the tool 18 is the diametrical size relationship between the diameter of cylindrical surface 56 of the sealing portion 40 and the minor diameter dimension 92 of the thread 76 that is created by the threading-forming section 42 of the tool 18. When a normal roll-forming tap has completed its internal thread-forming operation, the primary goal is to form the major diameter 90 and the thread flanks 94. The minor diameter 92 is normally not contacted by the tap, so therefore it is of rough shape and not tightly controlled size, and the minor diameter 92 is the most loosely-toleranced feature of most standard internal thread specifications. For hydroforming taps, however, a loosely-toleranced minor diameter 92 may lead to leakage of pressurized fluid during the thread forming and debris may be created. In addition, due to the material displaced in forming the internal thread, the roll-formed minor diameter 92 is generally smaller than the original extruded hole inner surface 66 formed by the cylindrical surface 56, so that the surface 56 would contact and scrape the thread's minor diameter 92 when the tool is withdrawn from the hole at the end of the cycle, potentially forming debris and modifying the thread profile.

This consideration of the tool withdrawal may be managed by designing the threads 58 of thread-forming portion 42 of tool 18 as a "controlled root diameter tap" which carefully expands and controls the minor diameter 92. By the proper selection of the controlled minor diameter on the tool 18 and the diameter of the cylindrical surface 56 of the sealing portion 40, the tool 18 can be extracted without detrimental contact with the newly formed minor diameter 92 to minimize leakage and the formation of slivers and other debris that could enter the hydroforming fluid.

The foregoing description of the invention is merely exemplary in nature and, thus, variations thereof are intended to be within the scope of the invention. For example, although the use of a controlled root diameter tap may be desirable, it may not be needed in some applications. Although the part being hydroformed is shown and referred to in the drawing as being a tube, it will be understood that hydroformed parts of other shape may also be provided with a threaded hole via the use of the tool disclosed herein.

What is claimed is:

1. A tool adapted to form a threaded hole in a hydroformed part while the part remains in a hydroforming die cavity, comprising;

a hole-piercing end portion adapted on advancement of the tool to pierce and form a hole in the part while hydroforming fluid under pressure remains in the part;

an extruding portion adapted on continued tool advancement to extrude an annular extrusion extending into the tube and having a cylindrical inner surface;

a sealing portion directly adjacent the extruding portion and having a cylindrical surface having a tight fit with the cylindrical inner surface of the annular extrusion and thereby adapted on continued tool advancement to seal the hole during the ongoing advancement and extrusion of the annular extrusion so that hydroforming fluid remains under pressure without leakage and loss of pressure; and a thread-forming portion directly adjacent the sealing portion and having controlled root diameter tapping threads adapted upon simultaneous rotation and continued advancement to form an internal thread within the extruded annular extrusion, said formed internal thread having tightly controlled major diameter, thread flank and minor diameter to obtain tight contact of the thread-forming portion of the tool with the formed internal thread of the extrusion, whereby the to prevent the leakage and loss of pressure of the hydroforming fluid during the simultaneous rotation and continued advancement, and the subsequent rotation and extraction of the thread-forming potion of the tool from the hydroformed part.

2. The tool of claim 1 further comprising the hole-piercing end portion and the extruding portion each having a cylindrical surface and the cylindrical surface of the extruding portion being of greater diameter than the cylindrical surface of the hole-piercing end portion.

3. The tool of claim 2 further comprising a concave-convex annular surface that extrudes the annular extrusion that extends into the part and the concave-convex annular surface transitions the shape of the tool from the hole-piercing end portion to the sealing portion.

4. The tool of claim 1 further comprising the hole-piercing end portion having a blunt end.

5. The tool of claim 4 further comprising a flat chamfer disposed at an acute angle to the blunt end and intersecting the blunt end and the cylindrical surface of the hole-piercing end portion.

6. A tool adapted to form a threaded hole in a hydroformed part while the part remains in a hydroforming die cavity, comprising;

a hole-piercing end portion having a blunt end and a cylindrical surface adapted on advancement of the tool to pierce and form a hole in the part;

an extruding portion having a concave-convex annular surface that progresses from the cylindrical surface of the hole-piercing end portion and is adapted on continued tool advancement to extrude an annular region and form an annular extrusion extending inward into the part;

a sealing portion directly adjacent the extruding portion and having a cylindrical surface that progresses from the concave-convex surface and is of a diameter that is greater than the diameter of the cylindrical surface of the hole-piercing end portion and is adapted on continued tool advancement to seal the hole and the annular extrusion during the ongoing advancement of the extruding portion so that hydroforming fluid remains under pressure without leakage and loss of pressure; and a thread-forming portion directly adjacent the sealing portion and having controlled root diameter tapping threads adapted upon simultaneous rotation and continued advancement of the tool to form internal threads within the annular extrusion with tightly toleranced control of the major diameter, the thread flank and the minor diameter of the formed thread, whereby the thread forming portion tightly fits the formed internal threads to prevent the leakage and loss of pressure of the hydroforming fluid during the simultaneous rotation and continued advancement, and the subsequent rotation and extraction of the thread-forming potion of the tool from the hydroformed part.

7. The tool of claim 6 further comprising a flat chamfer disposed at an acute angle to the blunt end and intersecting the blunt end and the cylindrical surface of the hole-piercing end portion.

8. A tool adapted to form a threaded hole in the wall of a hydroformed part while the part remains in a hydroforming die cavity and subject to pressurized fluid, comprising;
 a blunt end for engaging with the wall to support the wall against the pressurized fluid;
 a first cylindrical surface adjacent to the blunt end and a flat chamfer intersecting the blunt end and the cylindrical surface so that upon advancement of the tool a hole is pierced in the wall;
 a concave-convex annular surface that progresses from the cylindrical surface adjacent the blunt end and is adapted upon continued tool advancement to extrude an annular region surrounding the hole and form an annular extrusion that extends inward into the part;
 a second cylindrical surface directly adjacent the concave-convex annular surface and that progresses from the concave-convex surface and has a diameter that is greater than the diameter of the first cylindrical surface to seal the hole and the annular extrusion during the ongoing advancement of the tool so that pressurized fluid remains under pressure; and
 a thread-forming tapping thread directly adjacent the second cylindrical surface and adapted upon simultaneous rotation and continued advancement of the tool to form an internal thread within the annular extrusion, said thread-forming tapping thread having controlled root diameter tapping threads creating tightly toleranced control of the major diameter, the thread flank and the minor diameter of the formed thread, whereby the thread-forming tapping thread tightly fits the formed internal threads to prevent the leakage and loss of pressure of the hydroforming fluid during the simultaneous rotation and continued advancement, and the subsequent rotation and extraction of the thread-forming portion of the tool from the hydroformed part.

* * * * *